(No Model.) 8 Sheets—Sheet 1.

H. HARDY.
SUBTERRANEAN EXHIBITION APPARATUS.

No. 482,736. Patented Sept. 20, 1892.

WITNESSES:
John Becker
Fred White

INVENTOR:
Hippolyte Hardy,
By his Attorneys,
Arthur C. Fraser & Co.

(No Model.) 8 Sheets—Sheet 3.
H. HARDY.
SUBTERRANEAN EXHIBITION APPARATUS.

No. 482,736. Patented Sept. 20, 1892.

WITNESSES:
John Becker
Fred White

INVENTOR:
Hippolyte Hardy,
By his Attorneys,
Arthur C. Fraser & Co.

(No Model.) 8 Sheets—Sheet 4.

H. HARDY.
SUBTERRANEAN EXHIBITION APPARATUS.

No. 482,736. Patented Sept. 20, 1892.

WITNESSES:
John Becker
Fred White

INVENTOR:
Hippolyte Hardy,
By his Attorneys,
Arthur E. Fraser & Co.

(No Model.) 8 Sheets—Sheet 6.

H. HARDY.
SUBTERRANEAN EXHIBITION APPARATUS.

No. 482,736. Patented Sept. 20, 1892.

WITNESSES:
John Becker
Fred White

INVENTOR:
Hippolyte Hardy,
By his Attorneys,
Arthur C. Fraser & Co.

(No Model.) 8 Sheets—Sheet 7.

H. HARDY.
SUBTERRANEAN EXHIBITION APPARATUS.

No. 482,736. Patented Sept. 20, 1892.

WITNESSES:
John Becker
Fred White

INVENTOR:
Hippolyte Hardy
By his Attorneys,
Arthur C. Fraser & Co.

(No Model.) 8 Sheets—Sheet 8.

H. HARDY.
SUBTERRANEAN EXHIBITION APPARATUS.

No. 482,736. Patented Sept. 20, 1892.

FIG.17.

WITNESSES:
John Becker
Fred White

INVENTOR:
Hippolyte Hardy,
By his Attorneys,
Arthur E. Fraser &Co.

UNITED STATES PATENT OFFICE.

HIPPOLYTE HARDY, OF MINNEAPOLIS, MINNESOTA.

SUBTERRANEAN EXHIBITION APPARATUS.

SPECIFICATION forming part of Letters Patent No. 482,736, dated September 20, 1892.

Application filed February 10, 1891. Serial No. 380,900. (No model.)

*To all whom it may concern:*

Be it known that I, HIPPOLYTE HARDY, a citizen of the United States, residing in Minneapolis, in the county of Hennepin and State of Minnesota, have invented certain new and useful Improvements in Theatrical Devices for Producing Illusory Effects, of which the following is a specification.

This invention relates to means in the nature of theatrical or spectacular devices for producing certain illusory effects.

The object of this invention is to provide means for giving an exhibition of subterranean wonders supposed to be seen at a great depth below the surface of the earth without actually involving the expense, delay, danger, and annoyance of transporting sight-seers to an inconvenient depth. To this end the spectators, instead of being carried in elevators to a depth of one thousand feet or more beneath the surface, are actually carried down but a few feet or are not carried down at all; but by a resort to the illusory means provided by my invention they are given every impression of an actual descent to the depth at which the exhibition is supposed to be held.

Figures 1, 3A:
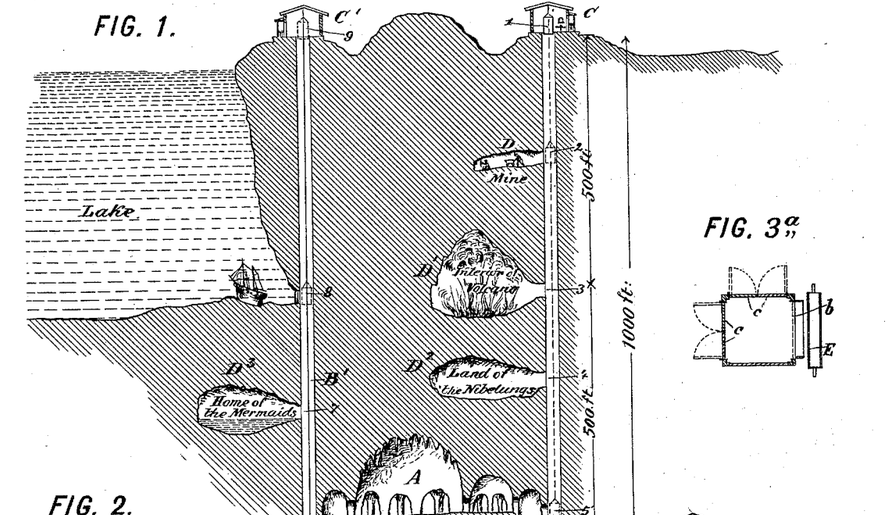

Figure 1 of the accompanying drawings, which is a vertical section of the earth's surface, is designed to show the supposed arrangement of such an exhibition. The exhibition consists of a series of caves or grottoes A A, located at a considerable depth beneath the surface of the earth—say, for example, one thousand feet—as shown, and reached by elevators traversing one or more vertical shafts B B'. Two shafts are shown, the one B for elevators carrying passengers down and the one B' for elevators carrying them up. The passengers enter at a pavilion or kiosk C, where after paying their fare they are permitted to enter an elevator standing in the position 1, and this elevator descends until it stops in the position 2, opposite the gallery of a mine lettered D, where the spectators observe miners at work mining coal or other minerals and performing the operations common to mines. The car continues its descent, and upon reaching the position 3 it stops and discloses some spectacular exhibition in a chamber D', which may, for example, portray the interior of a volcano with its fires and molten lava. Again resuming its descent, the car may stop at the position 4, where some other spectacular or fanciful exhibition is given at $D^2$—for example, a representation of the caves where the Nibelung dwarfs of ancient German mythology were supposed to toil. Finally, after a farther descent, the car stops in position 5 and discharges its passengers into the galleries and grottoes of the subterranean exhibition. In these galleries may be displayed various objects of interest pertaining to the underground world, such as representations of subterranean fires, flowing subterranean rivers and cascades, grottoes or mammoth caves hung with stalactites, &c. After the spectators have passed through the labyrinth of chambers constituting this exhibition they enter the elevator in the position 6 at the bottom of the shaft B'. The ascending car stops in the position 7, where any spectacular exhibition may be disclosed at $D^3$—such, for example, as the home of mermaids in a subterranean lake. Again rising, the car stops at 8, where the spectators are permitted to view the bottom of the lake or of the ocean, with examples of submarine life. A sunken wreck may be shown here, with a diver at work. Viewing this scene for a sufficient time, the car continues its ascent and stops in the position 9 to discharge its passengers, who pass out from the car to a pavilion or kiosk C', whence they make their exit to the grounds. It is obvious that to sink such deep shafts and to excavate caves and grottoes for a suitable exhibition at such a depth would be a work of great magnitude and involving such expense as to render it commercially impracticable. It would also be subject to the practical disadvantages of the dampness pervading the galleries of the exhibition and the necessity for continually pumping out the accumulated water, as is actually the case in mines. The heat would be apt to be insufferable and the problem of ventilation for affording the requisite supply of fresh air to the crowds of persons who should visit such an exhibition would be almost insurmountable. The desirability of holding such an exhibition in a cellar or sub-cellar involving an excavation to the depth of only about twenty-five or thirty feet or on the level of the ground is obvious, and if means can be provided for giving to the spectators the impression of a descent to the depth beneath the surface at which the exhibition is supposed to be held the feasibility of the plan both from an engineering and a commercial standpoint will be made manifest.

To provide such means is the object of my invention.

My invention in one of its simplest forms is shown in Figs. 2 and 3 of the accompanying drawings.

Figure 2:
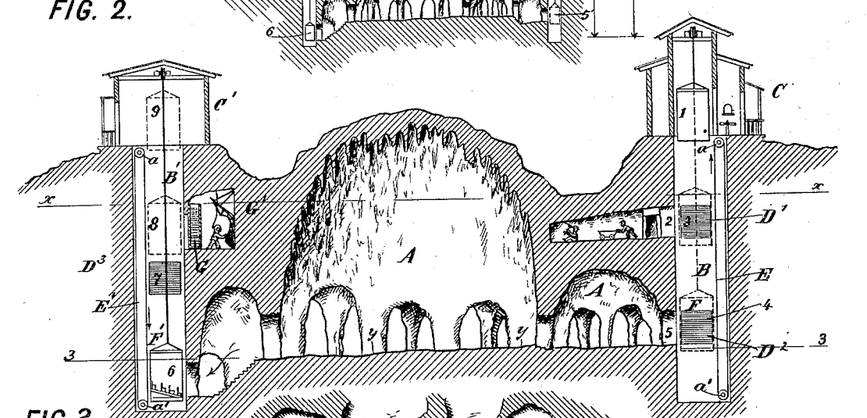
Fig. 2 is a vertical section corresponding generally to Fig. 1 and showing the actual arrangement reduced to its greatest simplicity.
Figure 3:
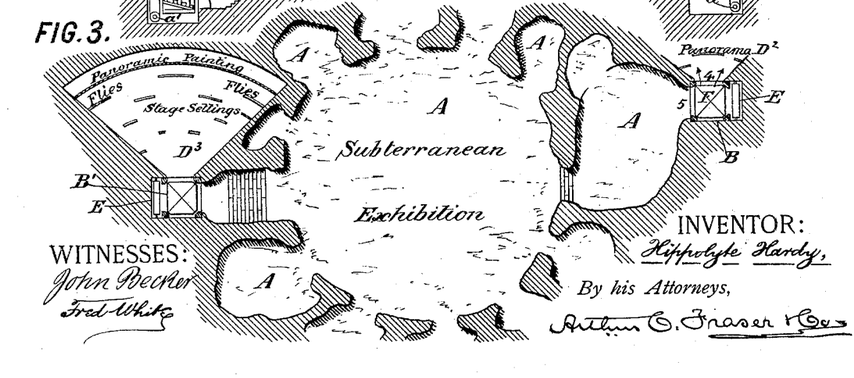
Fig. 3 is a fragmentary plan or horizontal section cut approximately in the plane of the line 3 3 in Fig. 2. The remaining figures show a more complicated structure pertaining to my complete invention, and which will be described subsequently.

Referring to Figs. 2 and 3, the exhibition-chambers A A, corresponding to those in Fig. 1, are excavated beneath the original surface of the earth (indicated by the dotted line $xx$) to a depth of approximately twenty-five or thirty feet, this being the level of the main floor $y$. The earth taken out is partially utilized in the formation of mounds on the surface, on two of which mounds the pavilions C and C' are built. The subterranean chambers may extend somewhat above the original surface of the ground by suitably arching them and covering with earth to conceal their existence from the exterior, the largest chamber being thus constructed in Fig. 2. The mounds upon the surface of the earth thus formed will be laid out after any manner known to landscape-gardeners for the formation of an ornamental park. The various vaulted chambers and passages or headings constituting the subterranean exhibition will be built of masonry or wood and filled over with the excavated earth. The two elevator-shafts B and B' will be formed in the course of the excavation and preferably walled in, and they may extend to a greater depth than the exhibition proper, as shown. The mine D is built as an upper or intermediate story of the excavation, the vaulted chamber or chambers beneath being of sufficiently less height to leave room for it, as shown in Fig. 2.

In descending a deep shaft in an elevator-car the impression of descent is imparted to the senses of the occupants of the car by means, first, of the upward movement of the walls around the car; second, of the slight tremor of the car, indicating that it is in motion; third, the diminution of light from above, the shaft becoming gradually darker and the opening above at the mouth of the shaft growing continually smaller, and, fourth, of the ascending currents of air passing through the car, indicating that the moving car is descending through a stationary column of air.

My invention aims to produce the same effects upon the senses of the occupants of the elevator and for a time proportional to a descent of a considerable depth beneath the surface, while the actual descent is, as stated, only about thirty feet. To accomplish this, the elevator-car necessarily remains stationary, or nearly so, during the greater portion of the time.

My invention provides the following means for creating the illusion of descent, namely: first, the provision of an upwardly-moving curtain or curtains painted to imitate the walls of the shaft and arranged on the side or sides of the shaft against the exposed side or sides of the car; second, the provision of means for mechanically imparting to a stationary car the tremor that is characteristic of a car which is in motion; third, the provision of means for mechanically cutting off the light from the shaft by contracting the light-opening at the top or mouth of the shaft at a rate proportional to its apparent contraction by the actual descent of a car, and, fourth, the provision of means for creating an upward current of air through the shaft and through the car approximately equal in volume and force to that which passes through the car by reason of its actual descent in a shaft. For creating the illusion of ascent the same provisions are made, except that the relative means and directions are reversed. All of these provisions may not be necessary to create a sufficiently realistic illusion; but I prefer to employ them all concurrently. Some of them are not shown in Figs. 2 and 3, the scale of these figures being too small to make them clear.

I will now proceed to describe the provisions illustrated in Figs. 2 and 3. On at least one side of each elevator-shaft is mounted a vertically-moving endless curtain E, painted in such manner as to imitate the surface of a shaft sunk in the earth—namely, with either the brick, stone, iron, or other lining of the shaft or with strata indicative of rock or other geologic formations through which the shaft is sunk. These curtains are mounted on rollers $a\ a'$ at the top and bottom of the shafts, respectively, these rollers being driven by suitable power to cause the curtains to ascend or descend, as the case may be, at a speed corresponding to the usual speed of ascent or descent of an elevator in a shaft, less at any particular time the actual speed of the elevator. For example, if the speed to be simulated is forty feet per second and the car is stationary the curtain will travel at the rate of forty feet per second; but if the car is moving at the rate of ten feet per second the curtain need travel only thirty feet per second. But one curtain is shown in Figs. 2 and 3, this curtain being arranged on one side of the shaft and against the side of the elevator-car F opposite to that through which the passengers enter or leave the subterranean exhibition. The elevator-car is consequently closed during its ascent or descent on all sides but one—namely, the side against the moving curtain—in order that the passengers may not be able to see the actual walls of the shaft. The sides of the car may advantageously be lined with mirrors, which will reflect the apparent movement of the curtain. Fig. 3ᵃ shows the arrangement of the car open on the side $b$ toward the curtain E and closed on the other three sides, but provided with doors $c\,c$ and $c'\,c'$ on two of the sides, which may be folding doors, as shown, or be otherwise arranged. Spectators entering the pavilion C will pass into the elevator-car through its open side, and the car will be started downwardly, but after entering the shaft will come gradually to a stop, while the curtain E is slowly started, its speed increasing as that of the car is reduced. After a suitable interval of time corresponding to a descent to the supposed level of the mine D the curtain will be stopped, giving the passengers the impression that the car has stopped; or the car may be caused to ascend very slowly to a position above the level of the mine and then be gradually started downward and stopped at the mine-level somewhat suddenly, as elevators are apt to be stopped, the curtain stopping at the same instant. Upon the car being thus stopped in the position 2, the doors $c\,c$ will be thrown open and the spectators given an opportunity to watch the operations conducted by the actors in the mine. The doors will then be closed and the car started downward again, and as its speed is reduced the curtain is started and driven at an accelerating speed until its maximum is attained, which will be continued while the car remains stationary for a suitable time, when the curtain is stopped again, thereby giving the illusion of the stopping of the car in position 3, Fig. 1, whereupon the side doors $c'$ are thrown open and the spectators permitted to view the spectacular or panoramic scene D', Fig. 1, the opening to which is shown at D' in Fig. 2. These doors being closed again, the curtain is started for a farther descent, another illusory stop being made, if desired, for the display of the panorama D², Fig. 1, the opening to which is shown at D² in Fig. 2 at a lower level, and which is partly shown in plan in Fig. 3. The construction of both panoramas D' and D² may be the same as that of D³, (shown in Fig. 2,) with a panoramic painting at the farther side and realistic stage-settings between it and the spectators and with or without pantomimic actors. At the end of the illusory descent the curtain is stopped with the car in the position 5, the doors $c\,c$ thrown open, and the passengers discharged into the galleries of the subterranean exhibition. The doors of the car will then be closed and the car run up instantly to position 1 again, to take in a new load of passengers. The spectators, having viewed the exhibition, pass into the ascending car F', standing at position 6, and, its doors $c\,c$ being closed, the car is started upward. It is then gradually stopped, while the curtain E' is gradually started and its speed gradually increased, the car remaining stationary in position 7, and the curtain moving at suitable speed for a sufficient time, whereupon it is stopped, the doors $c'\,c'$ thrown open, and the exhibition D³ disclosed. The illusory ascent is thus resumed, the car being moved to position 8 and the curtain driven at a rate corresponding to the supposed ascent from position 7 to 8. On arriving at the latter position the doors $c\,c$ are thrown open, disclosing the view of the supposed lake. To simulate this lake, a tank or aquarium G is employed filled with water, and in which fish are swimming and other specimens of marine life are seen. In a chamber G' on the other side of the tank, so as to be seen through the water thereof, an actor dressed in the garments of a diver is at work around the semblance of a sunken wreck, which may be partly painted on canvas and partly an actual construction, after the manner well understood by scenic artists in the construction of panoramic structures. The management of shaded light thrown upon the diver through gauze curtains is such as to maintain the illusion that he is actually at work under the water. After a sufficient time the doors $c\,c$ are closed and the car is again started upwardly, the curtain E' being again started and continued in motion for a time corresponding to the remaining supposed ascent of the car, the car meanwhile standing or moving slowly and imperceptibly up or down at any suitable point within the shaft. Preferably the car is gradually lowered to nearly the bottom of the shaft, and as the curtain is gradually stopped the car is gradually started upwardly, and when it has attained the full speed the curtain is stopped, and the car on emerging from the top of the shaft is stopped in the manner usual to elevator-cars in position 6, whereupon the passengers are discharged.

I will now describe the more complete apparatus shown in the remaining figures of the drawings, wherein—

Fig. 17 is a vertical section illustrating a modification. In the construction shown in these figures the arrangement of parts is somewhat modified. The descending elevator-shaft B is extended to a greater depth, and the tank G, which formerly was arranged in connection with the ascending shaft and above the level of the subterranean exhibition, is here arranged beneath the level of this exhibition and in connection with the descending shaft. Its arrangement adjacent to the descending or ascending shaft is a matter of choice, depending upon whether it is desired to show the submarine spectacle before entering the subterranean exhibition or during the reascent of the passengers after witnessing that exhibition. In the arrangement here shown the mine D is arranged to be witnessed from the ascending shaft, as shown in Fig. 10, an arrangement to some extent necessitated by that of the tank D in connection with the descending shaft.

Figure 4:
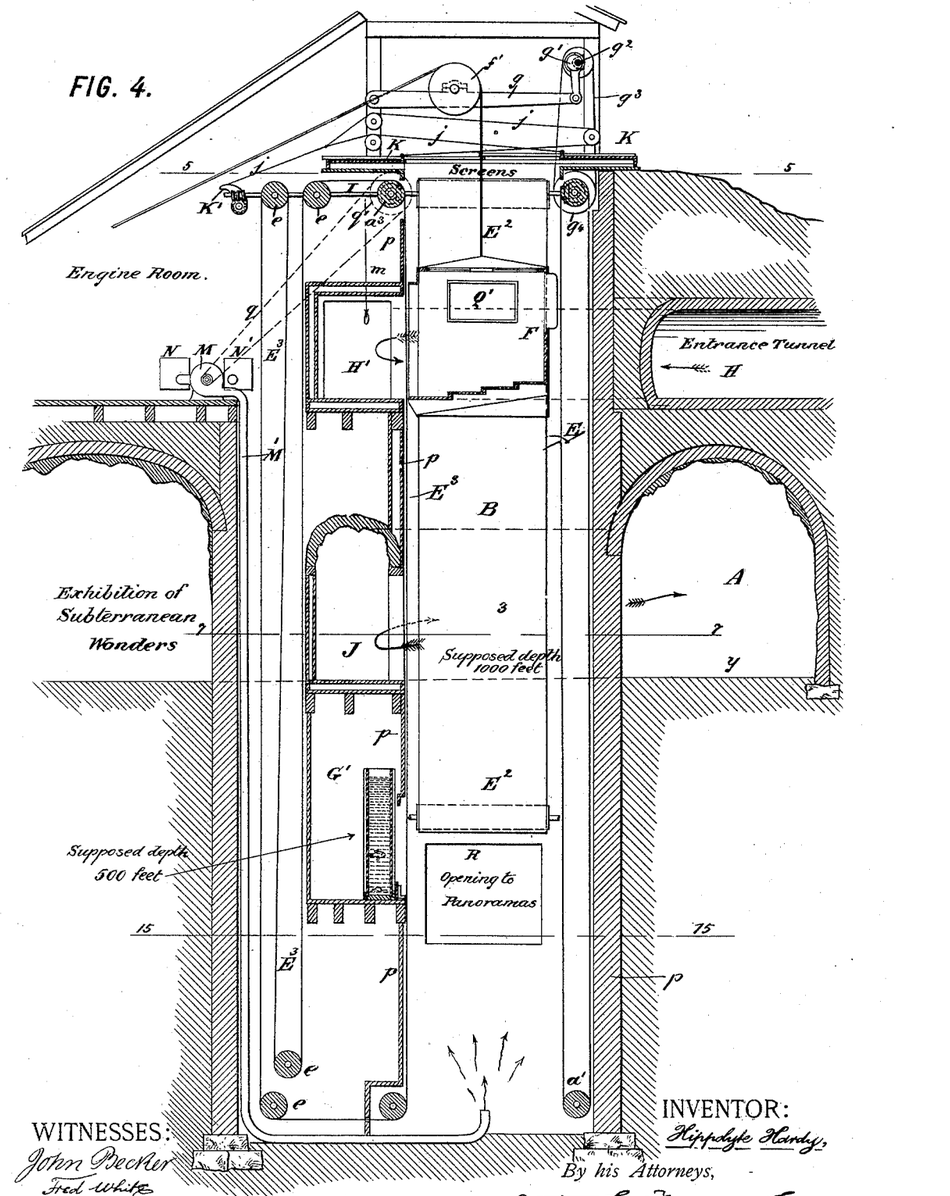
Fig. 4 is a vertical section of the portion of the apparatus pertaining to the decending elevator.
Figure 5:
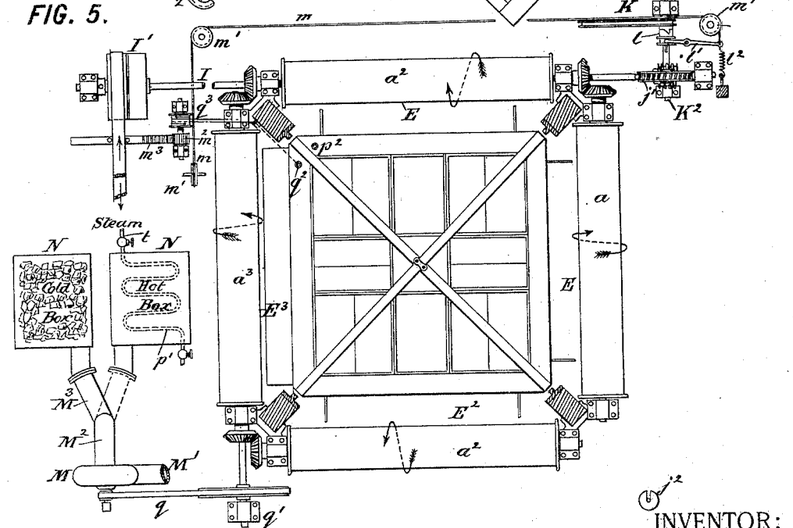
Fig. 5 is a plan of the elevator and part of the mechanism, the view being generally in horizontal section on approximately the line 5 5 in Fig. 4.
Figure 9:
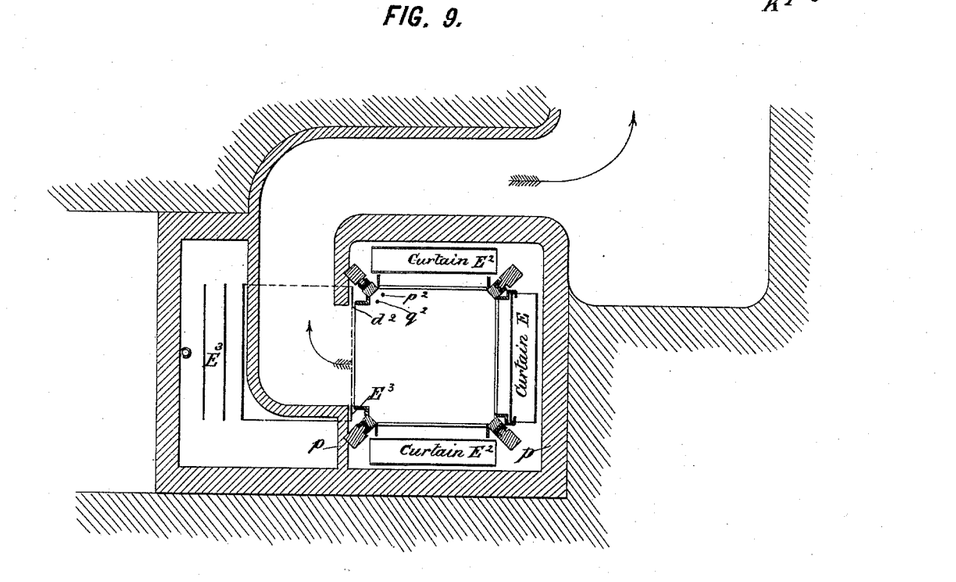
Fig. 9 is a horizontal section cut in the plane of the line 9 9 in Fig. 4.
Figure 14:
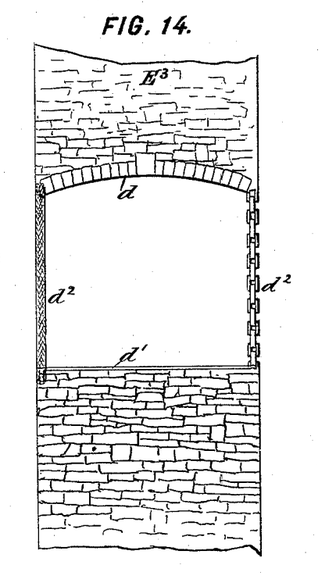
Fig. 14 is a fragmentary detail view of the curtain $E^3$.

Referring to Fig. 4, the spectators enter, preferably, through a tunnel H, which conducts them around the elevator-shaft to an entrance-vestibule H', from which they pass into the elevator F. This elevator is surrounded on all four sides by curtains painted to imitate the walls of the supposed shaft. There is the same endless curtain E, running on rollers $a$ $a'$, as already described. In addition there are two opposite side curtain $E^2$ $E^2$, as best shown in Figs. 5 and 9, and also on the side opposite the curtain E there is a much longer endless curtain $E^3$. The curtains $E^2$ $E^2$ are identical in construction and arrangement with the curtain E, their carrying-rollers $a^2$ being geared to the roller $a$ of the curtain E and the roller $a^3$ of the curtain $E^3$, as shown in Fig. 5, so that all the curtains are made to travel at the same speed. In Fig. 5 they are shown as all driven from one shaft I, which is that of the roller $a^2$ of one of the lateral curtains, and which is itself driven by a belt over pulleys I' in any usual manner. The curtain $E^3$ is in the construction shown of a length twice that of the supposed descent—say, for example, five hundred feet long. It is a complete continuous curtain, with the exception that at one point it is formed with an opening through it, as shown in Fig. 14. This opening can be conveniently constructed by connecting the two ends of the curtain to metal bars $d$ $d'$, respectively, and connecting the ends of these bars together by chains or straps $d^2$ at the sides of the curtain. This opening in the curtain is made fully as large as the door of the elevator-car. In the position shown in Fig. 4 the curtain stands with this opening coincident with the vestibule in front. The curtain is carried over additional rollers $e$ $e$, sufficient in number to take up the entire length of the curtain, which necessarily is several times in excess of the length of the shaft. The excavation or basement in which the exhibition is constructed is carried down to the depth indicated by the level $y$, and on this level is formed a passage or vestibule J directly under the vestibule H' and of similar proportions. When the car stands at this level, its passengers may pass out through the passage J into the rooms A A of the exhibition. This can be done, however, only when the curtain $E^3$ has been stopped with its opening coincident with the passage J. The tank G and room or space G' are arranged directly beneath the passage J. When the curtain $E^3$ is stopped with its opening coincident with the opening communicating with this tank and the elevator-car is brought to the same position, passengers can look into and through the tank at the submarine spectacle. Although the tank G is arranged below the exhibition-level, the operation is such that the passengers are unaware of this fact, but are caused to view the marine spectacle first and midway in point of time of their supposititious descent to the level of the exhibition.

The operation is as follows: The elevator F being in position 1 and the opening in curtain $E^3$ coincident with the passage H', the passengers are admitted to the elevator. The elevator is then started downward, preferably somewhat brusquely, in order to give a vivid impression of descent. The curtains all remaining stationary, the elevator descends rapidly at first until entirely beneath the level of the entering floor and until the opening through which the passengers entered has passed relatively upward out of their sight. The elevator is then gradually slowed and finally stopped, this operation being effected so gently as to be imperceptible to the passengers. Meanwhile the several curtains have been slowly started, and in proportion as the speed of the elevator-car was reduced the speed of the curtains has been accelerated until at the instant when the car comes to rest the curtains have attained full speed, thereby maintaining perfectly the illusion of a continued descent of the car at undiminished speed. The curtains continue to travel at full speed for such length of time as would be required for the car to descend to the supposed level of the first stopping-place—namely, the level of the submarine exhibition. Meanwhile the car, which may have descended previously nearly or quite to the bottom of the shaft, is caused to ascend very slowly, so that its ascent shall be imperceptible to its occupants, who are made to believe by the movement of the curtains that they are continuously descending. The car is thus raised to a suitable distance above the level of the tank G, preferably nearly to the top of the shaft. As the opening in curtain $E^3$ approaches in its travel the bottom of the shaft the curtains are gradually slowed and finally stopped with this opening in exact coincidence with the tank G. Meanwhile in proportion as the curtains are slowed the car is gradually started downward and its speed increased until at the instant when the curtains stop it attains full speed, being then still above the level of the tank G, and as the car descends to where the opening in the curtain comes into view the passengers see for the first time an interruption in the continuity of the descending shaft, and the car is brought to a stop in position 2 coincident with the tank G. The passengers are here given an opportunity to witness the submarine spectacle, after which the car is brusquely started downward again to continue the supposititious descent and the operation of slowly stopping the car and starting the curtains is repeated; but the transition is somewhat more rapid this time by reason of the fact that the car is already near the bottom of the shaft, leaving less room for a gradual transition; but by reason of the supposed greater depth the shaft contains so much less light than before that extreme nicety in the gradation is less important. The gradual creeping upward of the car during the travel of the curtains is repeated, and the travel of the curtains is continued until the entire length of the curtain $E^3$ has been unwound a second time, whereupon the curtains are stopped with the opening in this curtain coincident with the passage J. Meanwhile the gradual starting of the car downward with an accelerated speed proportioned to the diminishing speed of the curtains is repeated, and immediately after the stoppage of the curtains the car descends to the level of the opening and is stopped coincident therewith, whereupon the passengers make their exit into the passage J and thence to the rooms or caves of the subterranean exhibition. After all are out and their return has been stopped by a suitable door guarded by an attendant the empty car is run up to position 1 again, the curtains being moved sufficiently to bring the opening in curtain $E^3$ up to the level of the vestibule $H'$, whereupon a fresh load of passengers is admitted and the operations thus described are repeated.

In order that the impression of continued motion of the car may be maintained while the car is in fact standing still or moving very slowly, I provide for imparting to the car a slight tremor or minute shaking or vibrating motion. This may be effected in several ways, the preferable one being best shown in Fig. 4, where the suspending rope or ropes $f$ of the car pass over a pulley $f'$, which, instead of being mounted in fixed bearings, as usual, is mounted in bearings on a lever $g$, hung from a fixed support at one end and rapidly vibrated at the other end by being connected to an eccentric $g'$ on a rapidly-revolving shaft $g^2$. It is only necessary that this shaft be revolved while the curtains are in motion, since at other times the elevator is either moving itself and supplying its own vibration or is standing still, in which case any artificial tremor would be objectionable. To effect this, the shaft $g^2$ is driven from one of the roller-shafts carrying the curtains, preferably by being provided with a pulley, over which passes a belt $g^3$, driven from a pulley $g^4$ on the shaft of the roller $a$, as shown in Fig. 4. The shaft carrying the eccentric consequently revolves only when the curtains are in motion and at a speed proportionate to their speed.

In order to provide for diminishing the light entering the shaft from the top in proportion to the supposed descent of the elevator, I provide screens K K, consisting of horizontally-moving plates or sheets arranged at the top of the shaft B in the position shown in Fig. 4. These screens are shown in plan in Fig. 6. Each one consists of a plate of suitable flat material arranged to slide in guides $h\,h$, arranged obliquely, and each plate formed with an angular edge $i$, these angular edges being arranged to form a square coinciding in size and shape with the section of the shaft—that is to say, with its supposed section—or coincident with the inner surfaces of the four curtains. One of the plates or screens is arranged to slide over the other, so that by moving both equally toward one another the opening left between the edges $i\,i$ is contracted. Two such contracted positions are shown in dotted lines at $i'$ and $i''$ in Fig. 6. In accordance with the laws of perspective the opening requires to be diminished more rapidly at the beginning of the supposed descent than subsequently, its speed of diminution continually decreasing until the car reaches the bottom of the supposititious shaft. To provide for this differential motion, I operate the screens by means of cords $j\,j$, united together and extending, as shown in Fig. 4, to a spiral winding-on cam $K'$, which is driven by worm-gearing $j'$ from the shaft I. Fig. 4 shows the simplest arrangement of cords for this purpose; but in practice I prefer the arrangement shown in Figs. 5 to 8, where a single cord $j$, having a weight $j^2$ hung from its end, passes up thence over a pulley $k$, is fastened at $j^3$ to one of the screens K, extends thence around the pulley $k'$, is fastened at $j^4$ to the other screen, and passes around pulleys $k^2\,k^3$ and down over pulley $k^4$ to the cam $K'$, to which its other end is attached. This cam is shown in detail in three different positions in Fig. 7. It is mounted on a short shaft $K^2$, so as to turn freely thereon, being normally locked thereto by a clutch $l$, as shown in Fig. 5, held in engagement by a lever $l'$, acted on by a spring $l^2$. The clutch $l$ is splined on the shaft $K^2$. On this shaft is fixed a worm-wheel, which is engaged by the worm $j'$ on a driving-shaft I. By means of this gearing the screens K K are drawn together with a slowly-diminishing motion whenever the curtains are traveling, their movement stopping with that of the curtains. When the car F is brought to the starting position, (marked 1,) the operator steps out and pulls the cord or chain $m$, Fig. 4, which, as shown in Fig. 5, passes over sheaves $m'$ $m'$ and connects with lever $l'$, thereby vibrating this lever against spring $l^2$ and disengaging clutch $l$, whereupon the weight $j^2$ causes the screens K K to slide open, bringing the opening $i$ to the full size of the shaft and revolving the cam K' backward to the position marked 1 in Fig. 7. Upon releasing the cord the clutch $l$ again engages the cam and locks it to its shaft, thereby leaving the parts in readiness for the automatic operation of the springs during the movement of the curtains and in accordance with the supposititious descent of the car.

Figures 6, 7:
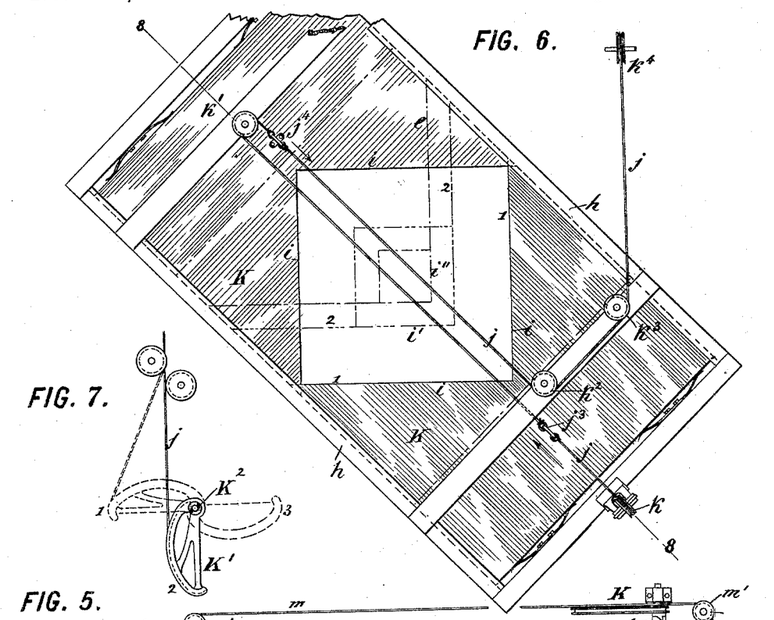
Fig. 6 is a plan of the screens for contracting the light-opening at the top of the shaft, these screens standing just above the plane of the section in Fig. 5.
Fig. 7 is a detail of the cam for operating these screens.
Figure 8:
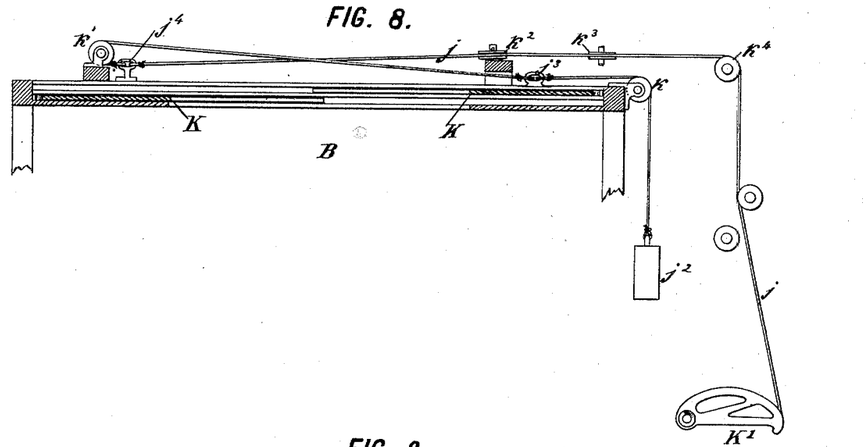
Fig. 8 is a vertical oblique section taken approximately on the line 8 8 in Fig. 6, showing the mechanism for operating the screens somewhat rearranged to make the connections of the several parts more clear.

In practice the cam K', instead of being formed as a perfect spiral, will be given a somewhat irregular contour, in order to impart to the opening formed by the screens varying speeds of diminution to compensate for the up-and-down movements of the elevator-car occurring during the course of its supposititious descent; but this is a refinement that it is not deemed necessary to illustrate. It is not designed that the top of the elevator-car shall be left open or made unobstructedly transparent, as this would give too much opportunity for the passengers to perceive how the moving curtains terminate by passing over rollers at the top and to perceive the want of perspective diminution of the supporting rope or ropes, features which would impair the illusion. To avoid this and yet admit the passage of sufficient light to enable the diminishing outline of the square of light entering through the opening in the screens to be seen with sufficient clearness, I propose to roof the elevator-car with what is known as "hammered glass;" but ground glass or other partially-transparent medium may be employed instead.

The means for providing the ascending current of air through the shaft during the time that the car is supposed to be descending but is in reality standing still or moving slowly upward consists of a blower M, the delivery-pipe M' of which extends down to the bottom of the shaft and turns upward therein, as shown in Fig. 4. The shaft is made as tight as possible by means of partitions or walls $p$ $p$, in order to prevent the escape of the air laterally and compel it to force itself up through the car. The blower M is driven only, by preference, while the curtains are in motion, since while the car itself is really moving its own motion generates the proper current of air, and when both the car and curtains are at rest no current of air is desired. To accomplish this, the blower M is driven from the same driving-shaft which propels the curtains. In Fig. 4 it is shown as driven by a belt $q$ from a pulley $q'$ on the shaft of one of the rollers $e$ for the curtain $E^3$. In Fig. 5 it is shown as being driven by a belt $q$ from a pulley $q'$, which is here shown as being fixed on the shaft of the roller $a^3$.

In a descent to a considerable depth within the earth one would expect to experience at first the sensation of cold, such as is felt in going into a deep cellar or a well, and afterward on arriving at a great depth to experience the sensation of heat, presumably radiated from the fires which are commonly supposed to rage within the earth. To carry out these details of the illusion, I propose that the air injected by the blower M shall be cold air during the initial portion of the supposititious descent and that toward the end of the descent this air shall be heated air. To effect this, I connect the induction-pipe $M^2$ of the blower by means of a swinging spout $M^3$, as shown in Fig. 5, first with a cold-air box N, wherein the air in being drawn through is passed in contact with ice or otherwise cooled, and subsequently with a hot-air box N', heated by a coil of steam-pipe $p'$ or by any other suitable means. During the initial part of the descent the spout $M^3$ occupies the position shown in full lines, drawing cold air from the box N. As the descent proceeds the operator in the engine room or wherever the blower is situated gradually swings the spout to the right in Fig. 5, thereby drawing in gradually less cold air and more air of the ordinary temperature, and toward the end of the descent, when the occupants of the car are supposed to have arrived at a great depth within the earth, he gradually swings the spout to the position shown in dotted lines, where it draws gradually more and more air from the hot-air box N' until the air injected into the elevator-shaft is given a sufficiently high temperature to carry out the illusion.

The several operations of the starting, accelerating, slowing, and stopping of the elevator-car and curtains in proper relative order may be performed automatically by mechanism suitably designed to that end; but for the purposes of my present application for patent I will assume them to be performed manually. This can best be done by an operator in the engine-room, who may, if desired, be guided by a small dummy or indicator geared to effect a counterpart of the movements of the car and curtains; or the movements of both the car and curtains may be controlled by an attendant in the car in the same manner that the movements of elevators are commonly controlled. In this case, in addition to the ordinary handling-rope, which will occupy the position shown at $p^2$ in Figs. 5 and 9, an additional rope may be provided, (shown at $q^2$.) This latter rope may extend, as shown in Fig. 5, to a drum $q^3$, fixed on the same shaft with a pinion $m^2$, meshing with a rack $m^3$, constituting the belt-shifter for shifting the driving-belt on pulleys I' from the fast to the loose pulley, or vice versa. This is illustrated merely as one suitable means for the purpose and the best that I have thus far devised; but many other and perhaps better appliances may be provided for this purpose.

Figure 11:
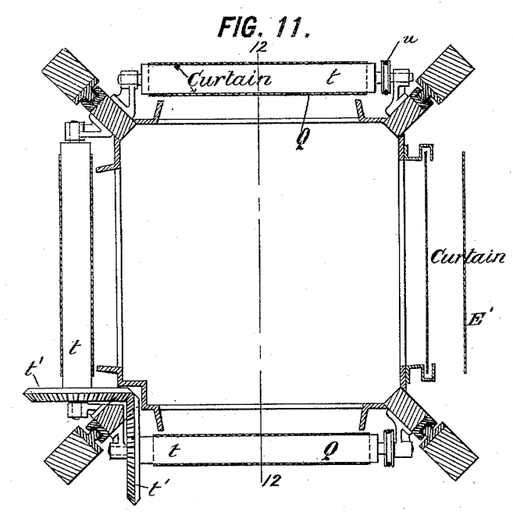
Fig. 11 is a horizontal section of the elevator-car shown in Fig. 10.
Figure 12:
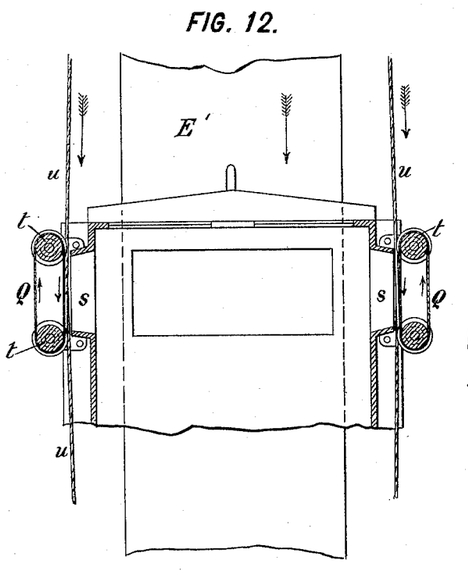
Fig. 12 is a vertical section thereof, both being on a larger scale.
Figure 13:
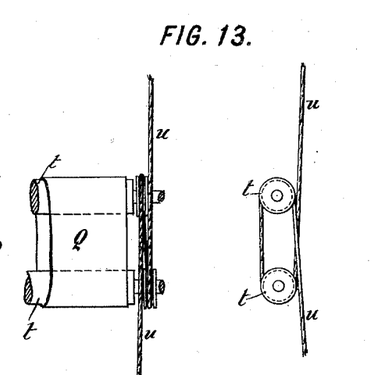
Fig. 13 is a fragmentary diagrammatic detail of Fig. 12.

I will now describe the constructions in connection with the ascending elevator. (Shown in Figs. 10, 11, and 12.) It will of course be understood that the spectators might be carried back to the surface by the same elevator that brought them down, it being only necessary to revolve the curtains in the opposite direction and reverse the movements of the screens and blower; but for practical reasons I prefer to provide distinct elevators, partly in order to keep the people going in opposite directions separate, but mainly by reason of the mechanical advantage of avoiding the reversal of motion and because with separate elevators the showing to the passengers of different spectacular representations during the descent and ascent is facilitated. It will also be understood that the ascending elevator might be an exact duplicate in construction of the descending elevator and its appurtenances already fully described. It is desirable, however, if possible, to avoid the expense and complication incident to such a duplication. The maintenance of the illusion is less important than the original creation of the illusion and does not necessitate such elaborate expedients. For this reason I have devised means for simplifying and cheapening the illusionary apparatus pertaining to the ascending elevator. The car F' of this elevator is constructed with tight-closing doors $c$ on the side through which the passengers enter, and is otherwise entirely closed around its lower portion, but is provided with windows $s\ s$, preferably arranged so high as to preclude too close an examination through them. On one side of the car is arranged an endless curtain E', running on rollers $a\ a'$ in exactly the same manner as the curtain E. The other three sides of the car are provided with curtains Q Q, carried by the car itself. These are best shown in Figs. 11 and 12. Each consists of a short curtain carried over two rollers $t\ t$, arranged suitably above and below the openings $s\ s$, and the inner sides of the curtains being arranged the same distance from the car that the walls of the shaft would ordinarily be. The curtains Q Q are necessarily driven at the same surface speed as the curtain E', and to this end an endless cord or belt $u$ is carried over the rollers $a\ a'$, which propel the curtain E', so that this cord travels at the same speed as this curtain, or it may be made to travel at a proportionately faster or slower speed. The cord $u$ passes over pulley-grooves formed on the rollers $t\ t$, Fig. 11, passing, preferably, in the manner shown in Fig. 13, first down half around the lower roller, then up half over the upper roller, and again down. Whatever may be the movement of the car, the relative movement of the curtain E' is thus communicated through the cord $u$ and rollers $t\ t$ to the curtain Q, so that the latter necessarily revolves at the same speed relatively to the car as that of the curtain E'. I have thus described how one of the curtains Q is driven. For driving the others another cord $u$ may be provided on the opposite side of the car, or the several rollers may be geared together by miter-gears $t'\ t'$, as shown in Fig. 11, or the several rollers may be geared together in any other way by means of belts or spur-gearing.

The operation of the ascending elevator is very simple. The passengers enter when the car is in the position shown in Fig. 10, the doors $c$ are closed, and the car is started upward. As the car is gradually stopped the curtain E' is started and speeded in inverse ratio and its motion continued until half the ascent is supposed to have been made, whereupon the curtain is stopped, the car brought into coincidence with the mine D, and the doors $c$ opened. After witnessing the mine these doors are closed again and the car started upward or the curtain started downward, or both, and the motion of the curtain is continued for a sufficient time to complete the remaining half of the supposed ascent, whereupon the car is brought to the upper position and the curtain stopped, the doors are thrown open, and the passengers pass out from the building C'. If the car be closed on top and lighted with artificial light within, no regulation of the light in the shaft will be required and the shaft may be kept very nearly dark. The same arrangement of curtains Q Q, carried by the car itself, may be applied in connection with the descending elevator. The use of one or two such curtains, taking the place of the longer curtain E or $E^2$, will effect a considerable economy, but somewhat at the expense of the creation of a perfect illusion. I have shown one such curtain in Fig. 4, lettered Q' and driven by a cord $u'$ in the same manner as already described.

Thus far in the description of Figs. 4 to 12 I have to avoid confusion disregarded the means for displaying the panoramic exhibitions shown at D', $D^2$, and $D^3$ in Figs. 1, 2, and 3. These panoramas are, however, an important part of the illusory system.

Figure 15:
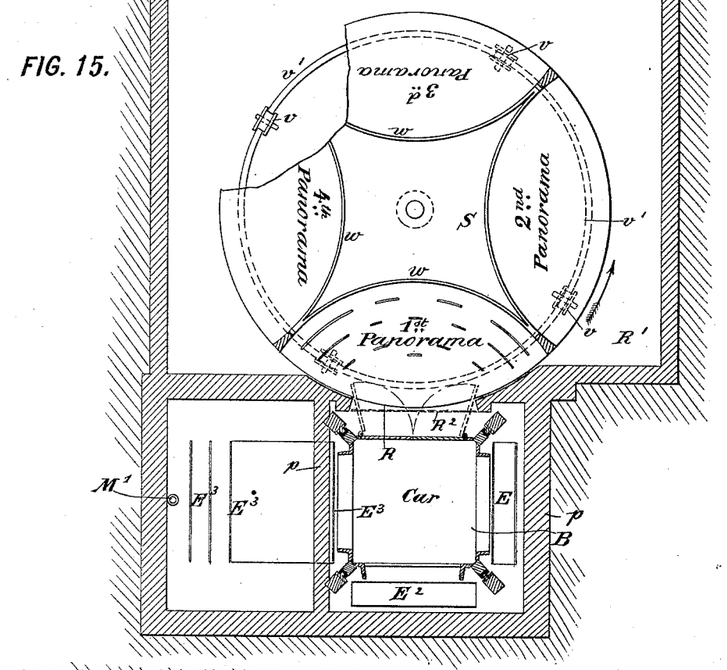
Fig. 15 is a horizontal section on the line 15 15 in Fig. 4.

Referring to Figs. 4 and 15, an opening R is formed in one side of the shaft B at suitable height, the curtain $E^2$ on this side extending down only to the top of this opening, as shown in Fig. 4. This opening communicates with a large room R', Fig. 15, in which is constructed a revolving platform S, supported on suitable rollers or wheels $v\ v$, rolling on a circular track $v'$, so that the platform S constitutes in effect a revolving stage. On this platform are mounted four or other suitable number of panoramic exhibitions consisting each of a suitably-painted background $w$ and properly-arranged stage-settings. The platform may be turned to bring either one of these panoramas toward the opening R, so as to be in position to be viewed by the occupants of the car. The opening R is normally closed and darkened by a door or curtain $R^2$.

The operation is as follows: At any suitable point in the illusory descent the car is stopped in coincidence with the opening R and its doors on the side communicating with this opening are thrown open, the door or curtain R² being also opened to expose the first of the four panoramas, which of course is suitably lighted. After a suitable time the communicating doors are closed and the car continues its illusory descent, the platform S being revolved to bring the second or next panorama into position to be viewed. After any suitable interval the curtains will be stopped with the car in the same position, the doors again thrown open, and the second panorama displayed. The illusory descent will then be repeated, while the platform S is turned to bring the third panorama into position, which in turn will de displayed, and so on. The display of the panoramas may be effected at any desired points or intervals in the descent either before or after displaying the marine spectacle or tank G. The platform S might be extended with the panoramas side by side and be moved in a straight line, if desired; but the rotary arrangement is preferable, as taking less room. I have shown the arrangement of a straight platform as applied to the panoramas to be viewed from the ascending elevator in Fig. 16; but either the reciprocating or rotary arrangement may be applied to either elevator.

Figure 10:
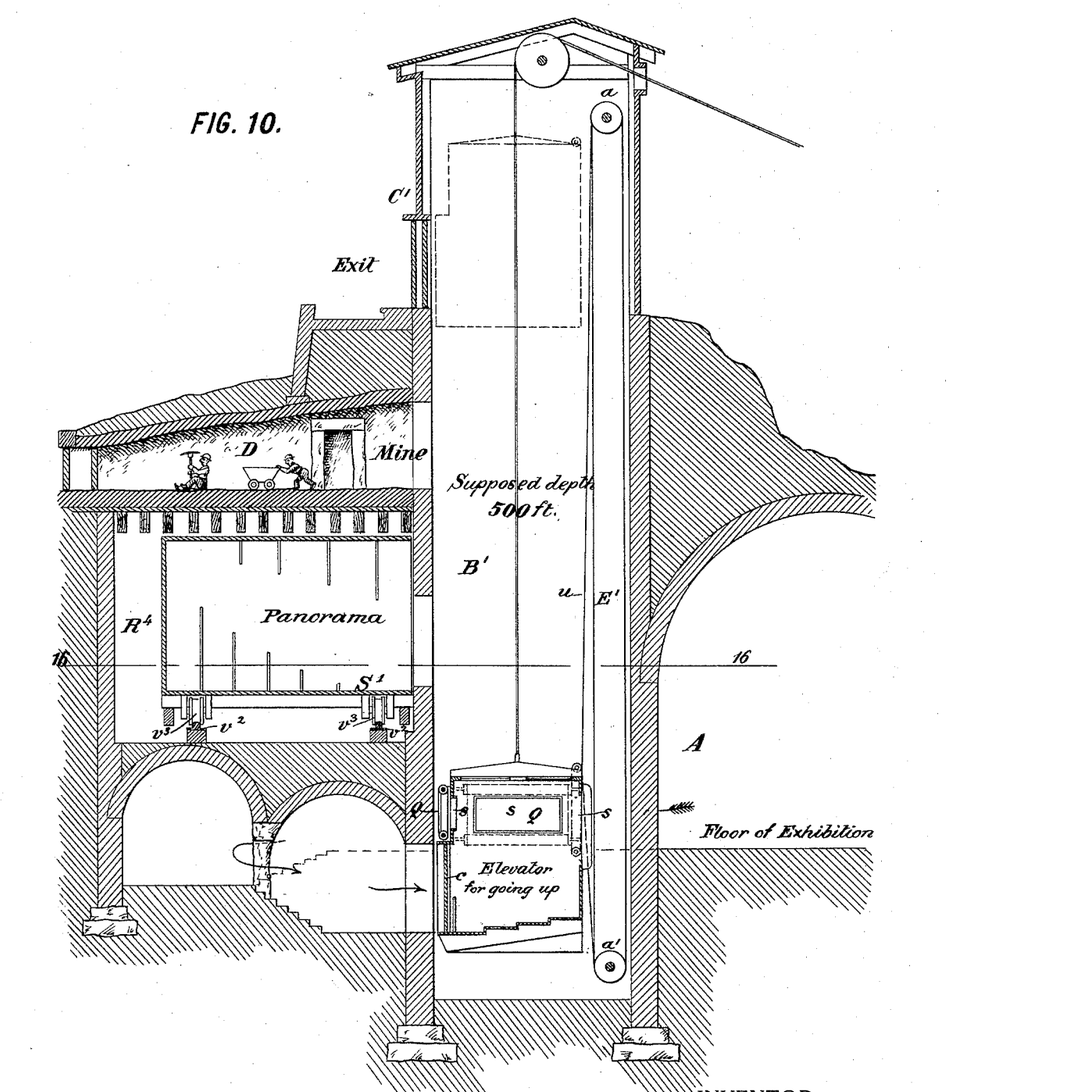
Fig. 10 is a vertical section of the ascending shaft and elevator and the mechanism pertaining thereto.
Figure 16:
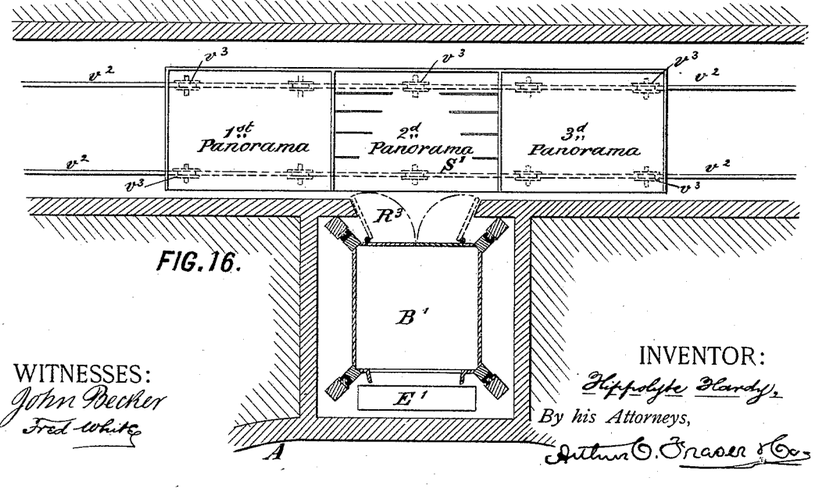
Fig. 16 is a horizontal section on the line 16 16 in Fig. 10.

Referring to Figs. 10 and 16, the shaft B' is formed at one side with an opening R³, opening into a chamber R⁴, in which are laid rails $v^2$, on which travels the panorama-platform S', supported on wheels $v^3$. Each time that the car is brought into coincidence with the opening R³ and the curtain stopped the platform S' is moved to bring a different panorama into position to be viewed from the opening. Two or more panoramas may thus be shown in the course of the ascent, and by revolving the curtain between their exhibitions the illusion of ascent to different levels at which the different spectacular panoramas are displayed will be maintained.

In some locations the nature of the soil is such that it will not permit without undue expense of excavating to any such depth as, say, twenty-five or thirty feet, as is desirable for such an exhibition as my invention provides. In such case I contemplate holding the exhibition on or even slightly above the level of the ground. For this purpose a suitable building will be erected upon the ground and made with the rooms devoted to the purposes of the exhibition constructed without windows, so as to exclude all exterior light, the rooms of the building being fashioned and decorated interiorly in imitation of subterranean chambers. The elevator-shafts B and B', or at least the descending shaft B, will be sunk sufficiently into the ground to enable the car to be started down to carry out fully the effect of beginning an actual descent, the car being afterward brought up to the level of the exhibition in the manner already described, except that the exhibition-level, instead of being below the ground, as indicated in Figs. 4 and 10, will be on a level with or perhaps slightly above the ground. In such case only the shaft B will require to be constructed so as to overcome the difficulties arising from the nature of the soil, such as quicksand or water strata. It is not essential to my invention that any portion of the exhibition or elevator-shafts be carried below the surface, nor even that there be any actual descent of the elevator-car, as the necessary illusion can be effected without any up or down movement of the car whatever.

Figure 17:
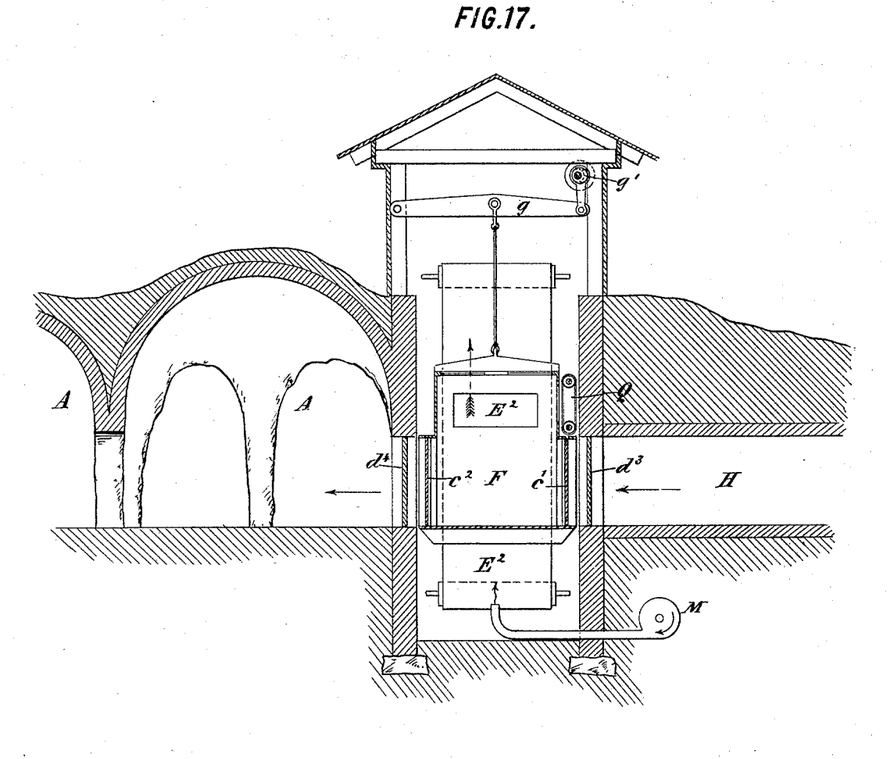

Fig. 17 shows a modified construction of my invention embodying the features last above suggested, the exhibition being wholly on the level of the ground and the elevator-car having no descent or ascent whatever. The passengers enter from a room or tunnel H into the elevator-car F, the doors $d^3$ and $c'$ are closed, (the door $c^2$ being already closed,) and the curtains E² and Q are slowly started and brought rapidly to full speed. At the same time the car is vibrated by being hung from a lever $g$, which is given a rapid motion at one end by an eccentric $g'$ in the manner already described. By these means, in connection with the upward injection of air from a blower M, a sufficient illusion is maintained. At the end of the supposed descent the movement of the curtains and the rotation of the eccentric $g'$ and blower M are gradually stopped, whereupon the doors $c^2$ and $d^4$ are opened and the spectators pass out into the rooms A A of the exhibition.

My invention is not limited to the use, in combination, of all the features or elements hereinbefore described, as some of them may be omitted without materially detracting from the efficacy of the results obtained.

Those features of my invention which I regard as essential are defined in the claims forming part of this specification.

I claim as my invention, in theatrical or spectacular devices for producing illusory effects, the following-defined novel features, substantially as hereinbefore set forth, namely:

1. In a theatrical or spectacular device for producing illusory effects, the combination, with an elevator-car, of a traveling curtain arranged to move adjacent thereto in vertical direction and painted in imitation of the walls of a shaft in which the car is supposed to ascend or descend, whereby by the movement of such curtain the illusion is created of a movement of the car.

2. In a theatrical or spectacular device for producing illusory effects, the combination, with an elevator-car, of a vertically-moving endless revolving curtain arranged exterior to an opening in the side of the car and painted in imitation of the walls of a shaft in which the car is supposed to move.

3. In a theatrical or spectacular device for producing illusory effects, the combination, with an elevator-car, of a traveling curtain arranged to move in vertical direction adjacent thereto and painted in imitation of the walls of a shaft and means for imparting a tremor to the car during the movement of said curtain, whereby the illusion is created of a movement of the car.

4. In a theatrical or spectacular device for producing illusory effects, the combination, with an elevator-car and its shaft, of curtains arranged in said shaft adjacent to the sides of the car and driving mechanism for moving them simultaneously in vertical direction.

5. In a theatrical or spectacular device for producing illusory effects, the combination, with an elevator-car and a traveling curtain arranged to move in vertical direction adjacent thereto, of means for imparting a tremor to the car, consisting of a lever from which the car is hung and mechanism for imparting short and rapid vibrations to said lever.

6. In a theatrical or spectacular device for producing illusory effects, the combination of a vertical shaft, an elevator-car mounted therein, a vertically-moving curtain arranged to create the illusion of a movement of the car within said shaft, and movable screens at the top of said shaft for gradually cutting off the light proportionally to the supposed descent of the car.

7. In a theatrical or spectacular device for producing illusory effects, the combination of a vertical shaft, an elevator-car mounted therein, a vertically-moving curtain arranged to create the illusion of a movement of the car within said shaft, and movable screens at the top of said shaft arranged to overlap, forming between them a rectangular opening corresponding in shape to the shaft and adapted by their movement to reduce or enlarge the opening proportionally to the supposed descent or ascent of the car in said shaft.

8. In a theatrical or spectacular device for producing illusory effects, the combination, with an elevator-car and its shaft, of a blower for forcing air through said shaft to contribute to the illusion of a movement of the car.

9. In a theatrical or spectacular device for producing illusory effects, the combination, with an elevator-car and its shaft, of a blower for forcing air through said shaft and a source of hot or cold air, adapted to be put into communication with said blower, whereby air of different temperatures may be forced into said shaft at different times.

10. In a theatrical or spectacular device for producing illusory effects, the combination, with an elevator-car and its shaft, of a blower for forcing air through said shaft, a cold-air box, a hot-air box, and a swinging spout or section of pipe for establishing communication between the suction of the blower and either of said boxes.

11. In a theatrical or spectacular device for producing illusory effects, the combination of a vertical shaft, an elevator-car therein, an opening through one side of the shaft for the passage of passengers into or from said car, and a traveling curtain arranged to move vertically along the side of the shaft through which said opening is formed and having an opening adapted to coincide with said opening, whereby passengers may enter or leave the car through the opening in said curtain.

12. In a theatrical or spectacular device for producing illusory effects, the combination of a vertical shaft, an elevator-car movable therein, openings into said shaft at different heights on one side thereof, and an endless traveling curtain arranged to move vertically along the side of the shaft containing said openings and formed with an opening adapted to coincide with either of said openings, whereby different positions of said curtain disclose different openings from said shaft.

13. In a theatrical or spectacular device for producing illusory effects, the combination of a vertical shaft, an elevator-car movable therein, openings into said shaft at different heights, one for the admission of passengers to the car, another for their exit therefrom, and a third for displaying to the passengers a scenic or spectacular representation, one or more revolving curtains lining the walls of said shaft for conveying the illusion of a continued movement of the car within said shaft, and mechanism for starting, driving, and stopping said curtains and for starting, driving, and stopping the car.

14. In a theatrical or spectacular device for producing illusory effects, the combination of a vertical shaft, an elevator-car movable therein, openings into said shaft at different heights, one for the admission of passengers to the car and another for their exit therefrom, a marine exhibition or aquarium-tank arranged behind a third opening, and one or more revolving curtains lining the walls of said shaft for conveying the illusion of a continued movement of the car within said shaft.

15. In a theatrical or spectacular device for producing illusory effects, the combination, with an elevator-car having an opening in its side, of an endless revolving curtain arranged outside said opening, rollers carrying said curtain mounted in bearings carried by the car, and means for revolving said rollers and curtain.

16. In a theatrical or spectacular device for producing illusory effects, the combination, with an elevator-car having openings in its sides, of a vertical shaft in which said car is movable, an endless curtain lining one end of said shaft and movable in vertical directions relatively to said car, an endless revolving curtain arranged outside one of the openings in said car on another side of said shaft, rollers carrying said curtain mounted in bearings carried by the car, and a driving-belt $u$, driven at a speed proportionate to that of the curtain lining said shaft and arranged to impart rotation to the rollers of the curtain carried by the car, whereby the latter or smaller curtain is driven at the same surface speed relatively to the car as the larger curtain.

17. In a theatrical or spectacular device for producing illusory effects, the combination of an elevator-car, a traveling curtain arranged to move in vertical direction adjacent thereto to create the illusion of a movement of the car, and a panoramic spectacle in a chamber at one side of the car, with communicating openings, whereby by suspending the movement of the curtain, displaying the panorama to the occupants of the car, and closing said openings and resuming the movement of the curtain the illusion is imparted of a scene exhibited at some point in the descent or ascent of the car.

18. In a theatrical or spectacular device for producing illusory effects, the combination of an elevator-car and a traveling curtain arranged to move adjacent thereto in vertical direction to create the illusion of a movement of the car with two or more panoramas mounted on a movable platform arranged in a chamber adjacent to the car, so that either panorama may be exhibited to the occupants of the car through communicating openings, whereby by suspending the movement of the curtain, displaying a panorama, then closing the openings, resuming the movement of the curtain and moving the platform to bring another panorama into position to be viewed, again suspending the movement of the curtain, and displaying the panorama the illusion is created of a plurality of scenes viewed at different levels in the course of the descent or ascent of the car.

In witness whereof I have hereunto signed my name in the presence of two subscribing witnesses.

HIPPOLYTE HARDY.

Witnesses:
CHARLES J. BARTLESON,
IDA SHERRY.